(12) United States Patent
Wehmer (10) Patent No.: US 7,873,571 B1
(45) Date of Patent: Jan. 18, 2011

(54) BROKERAGE ACCOUNT FUND MANAGEMENT METHOD

(75) Inventor: Edward J. Wehmer, Lake Forest, IL (US)

(73) Assignee: Wintrust Financial Corporation, Lake Forest, IL (US)

( * ) Notice: Subject to any disclaimer, the term of this patent is extended or adjusted under 35 U.S.C. 154(b) by 1943 days.

(21) Appl. No.: 10/449,556

(22) Filed: May 30, 2003

(51) Int. Cl.
*G06Q 40/00* (2006.01)

(52) U.S. Cl. .......................................... 705/39; 705/35

(58) Field of Classification Search ................... 705/39
See application file for complete search history.

(56) References Cited

U.S. PATENT DOCUMENTS

| | | | | |
|---|---|---|---|---|
| 4,694,397 | A | * | 9/1987 | Grant et al. ................... 705/42 |
| 5,893,078 | A | * | 4/1999 | Paulson ........................ 705/35 |
| 6,374,231 | B1 | | 4/2002 | Bent et al. |
| 7,509,286 | B1 | * | 3/2009 | Bent et al. ..................... 705/39 |
| 7,672,886 | B2 | * | 3/2010 | Bent et al. ..................... 705/35 |
| 2002/0091637 | A1 | | 7/2002 | Bent et al. |
| 2003/0135437 | A1 | * | 7/2003 | Jacobsen ...................... 705/35 |
| 2004/0002910 | A1 | * | 1/2004 | Mizukami .................... 705/36 |
| 2005/0108149 | A1 | | 5/2005 | Bent et al. |
| 2005/0228733 | A1 | | 10/2005 | Bent et al. |

OTHER PUBLICATIONS

F.D.I.C.'s Financial Institution Employee's Guide to Deposit Insurance Principles (Apr. 4, 2002) http://web.archive.org/web/20020404201805/http://www.fdic.gov/deposit/deposits/financial/principles.html.*
Security First Launches Virtual Financial Manager 4.0. Nov. 12, 1998. PR Newswire, p. 1681.*
"Financial Management Account—The Insured Deposit Acount"; from www.salomonsmithbarney.com; Mar. 25, 2002; pp. 1-2.
"Bank Deposit Program"; from www.smithbarney.com; May 30, 2003; pp. 1-3.
"Insured Deposit Account"; from www.smithbarney.com; May 30, 2003; pp. 1-2.
Sample Statement of Account; Wayne Hummer Investments LLC; Mar. 30, 2002; pp. 1-4.
Select Consolidation Summary; Salomon Smith Barney; Oct. 28, 2001; pp. 1-7.
"New DBP Deposit and Withdrawal Procedures"; Sep. 2001; pp. 1-2.
"Bank Deposit Program Disclosure Statement"; Salomon Smith Barney; Nov. 2001; pp. 1-4.
Nelson, Judy, Merrill Lynch; client letter with attachments; Mar. 2000; pp. 1-13.
"General Questions"; Salomon Smith Barney; Feb. 2002, pp. 1-25.

* cited by examiner

*Primary Examiner*—Charles R Kyle
*Assistant Examiner*—Seth Weis
(74) *Attorney, Agent, or Firm*—Vedder Price P.C.

(57) ABSTRACT

The funds of a client of a brokerage, are automatically transferred into and retrieved from affiliated banks on an as-needed basis. Funds on deposit at banks are F.D.I.C. insured and earn interest. Multiple banks that are commonly owned and separately chartered and which receive brokerage account funds, enable the brokerage to multiply the F.D.I.C. insurance coverage for client funds. The aggregate amount of funds transferred into affiliated banks is limited to prevent runs on a bank. The funds of a client transferred into each bank is limited to multiply the amount of FDIC insurance that can be provided to each client of a brokerage.

6 Claims, 5 Drawing Sheets

BROKERAGE ACCOUNT FUND MANAGEMENT METHOD

BACKGROUND OF THE INVENTION

Stockbrokers and brokerage houses (i.e., a stock brokerage or brokerage) continue to purchase and sell securities for investors, notwithstanding the growing popularity of online securities trading. As is well known, when an investor buys a security, the brokerage acts on the investor's behalf to purchase the security but the investor eventually pays the brokerage for the purchase price. When an investor sells a security, the proceeds of the sale pass through the brokerage to the investor, but many investors often choose to leave funds with a stock brokerage in a client brokerage account. A client brokerage account is well known to be a record of the client's purchases and sales of securities and other money market instruments, debits and credits of monies as well as funds and securities held in the account, where among other things, a client's funds are kept available for use by the investor.

Although funds in a client's brokerage account are protected by the Securities Investor Protection Corporation (S.I.P.C.) under certain circumstances, and in some cases, interest bearing, S.I.P.C. protection is limited and the rate of return provided by brokerages is usually less than the interest offered by banks, whereat account balances are insured by the Federal Deposit Insurance Corporation (F.D.I.C.). A method and apparatus for managing funds held in a brokerage account of a client of a stock brokerage whereby such funds could earn interest and be insured would be an improvement over the prior art.

DETAILED DESCRIPTION OF THE PREFERRED EMBODIMENTS

Figure 1:
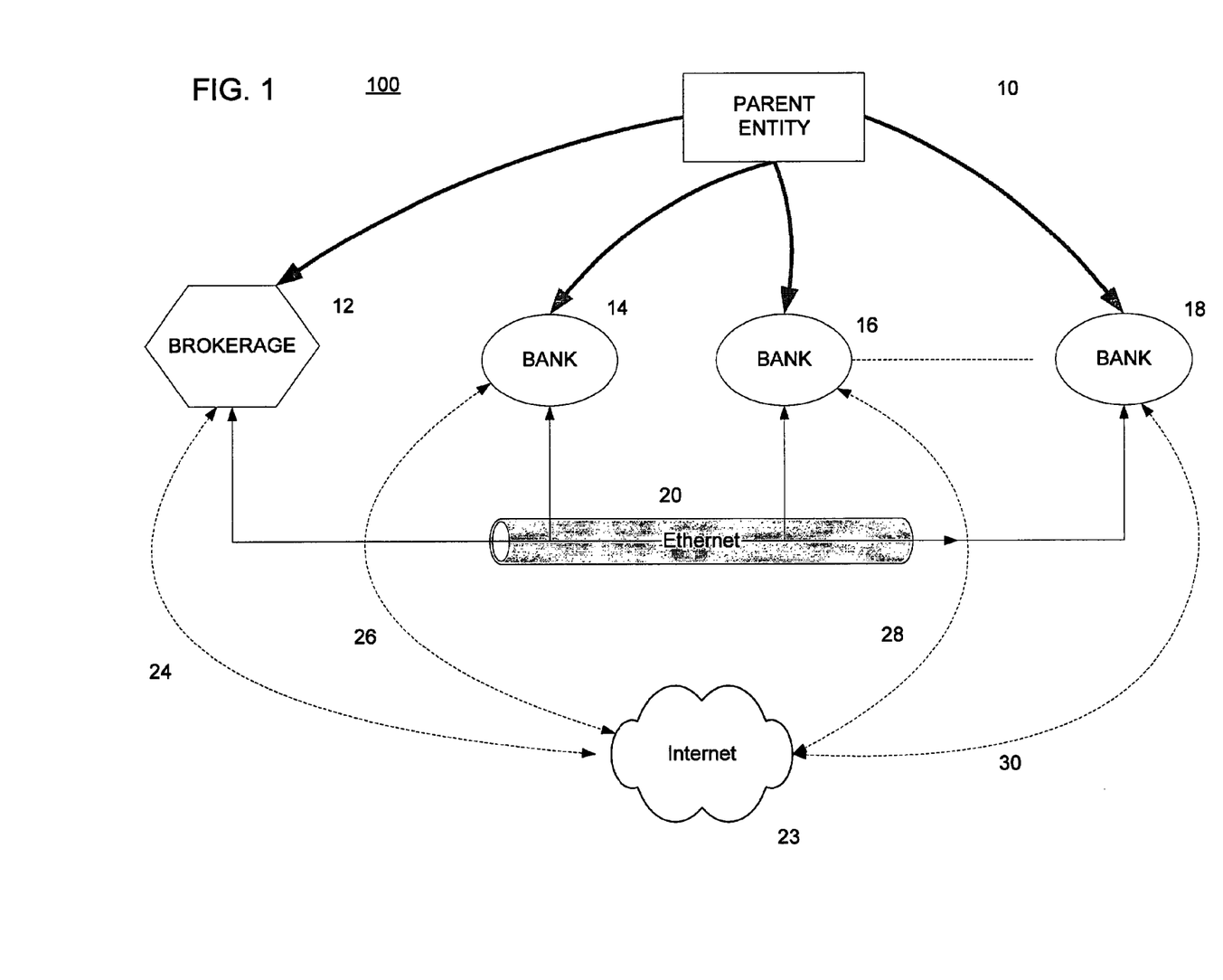
FIG. 1 depicts common ownership of a brokerage and separately-chartered banks and electronic communication pathways between them.

FIG. 1 depicts a brokerage 12 and separately chartered banks 14, 16, and 18 that are affiliated by virtue of a parent entity 10. The brokerage 12 and the banks are "affiliated" if they are either commonly owned by a parent entity 10, or commonly controlled by a parent entity 10, or both commonly owned and commonly controlled.

Parent entity 10 can take the form of a corporate entity, but can also be a partnership as well as a sole proprietorship or any other valid business organization or structure. The condition of being "owned" includes for example a controlling number or voting shares of stock of each bank as well as the brokerage, the actual or constructive ownership of which is held, voted or controlled by the parent, entity 10. A sole proprietor as well as a partnership or general partner of a partner can also "own" as well as "control" banks and a brokerage that are considered to be "affiliated." For purposes of claim construction, "commonly owned" also means commonly controlled.

The brokerage 12 and the banks 14, 16, and 18 are operatively coupled together via one or more data links, enabling them to share client data. Examples of data links include an Ethernet connection 20 for example, or via the Internet 23, using appropriate data links 24, 26, 28 and 30 that couple the brokerage 12 and the banks 14, 16, and 18 together via the Internet 23.

Because the brokerage 12 and the banks 14, 16 and 18 are affiliated (by the parent entity 10) they are able to more-freely share information about their respective clients. Inasmuch as they are commonly owned entities, client/customer information can be exchanged and held in confidence among them. Common ownership or other affiliation also provides better management and investment alternatives for the funds of clients of the brokerage.

The brokerage 12 provides securities trading services to its clients. When a client of the brokerage 12 sells and buys securities, sale proceeds and purchase funds flow into and out of an account for the client that is established at the brokerage. In executing trades for an investor, the brokerage acts as an agent of the investor. In order to accomplish trades, a client of a brokerage usually maintains a brokerage account into which a client's funds are deposited by the client in order to pay for securities purchased by the brokerage. On the other hand, distributions and sale proceeds flow into a brokerage account from which, sale proceeds can be withdrawn by the client. As used herein, the term "account" refers to any record of debits and credits attributable to a client or other entity. A brokerage account is therefore a record of purchases and sales of securities and other money market instruments and debits and credits of monies attributable to or owned by an entity with which a brokerage does business.

By virtue of the common ownership of the brokerage 12 and the banks 14, 16 and 18, an improved method of managing the funds of a client of the brokerage 12 provides for automatically electronically transferring client brokerage account funds from the client's brokerage account into one or more accounts set up for, or existing for the client at one or more affiliated banks. Pursuant to a client's authorization, funds may be transferred from the client's brokerage account into one or more interest-bearing, F.D.I.C.-insured accounts at commonly-owned banks, whenever the balance in the client's brokerage account exceeds a predetermined threshold. As funds are needed by the brokerage or the client, the funds are automatically and electronically retrieved from the affiliated banks and deposited into the client's brokerage account.

In a preferred embodiment, accounts can be established at each bank for each client of a brokerage and funds can be transferred into and out of accounts for a brokerage account client at one or more banks. In an alternate embodiment, client brokerage account funds for several clients of the brokerage are aggregated. In such an alternate embodiment, the brokerage transfers portions of the aggregated client brokerage account funds into one custodial account at each bank on which each bank pays interest. The brokerage and each respective bank then tracks each client's funds that comprise an aggregated amount. In the aforementioned alternate embodiment, client brokerage account funds are aggregated by the brokerage on a daily basis. The aggregated client brokerage account funds are then electronically distributed at the end of each trading day by the brokerage into the aforementioned custodial accounts whereat funds in the custodial accounts earn interest and are insured by F.D.I.C. By depositing a client's account funds into each bank, a client's brokerage account funds can be effectively insured by multiples of the F.D.I.C. insurance limit while the funds are on deposit in the banks and earning interest.

By automatically and electronically transferring funds into and out of separate, insured, interest-bearing accounts at affiliated banks, brokerage account funds that would otherwise be insured only up to the S.I.P.C. limit can be insured by multiples of the F.D.I.C. limit and earn interest at rates that are usually higher than that paid by brokerages on brokerage account balances.

Figure 2:
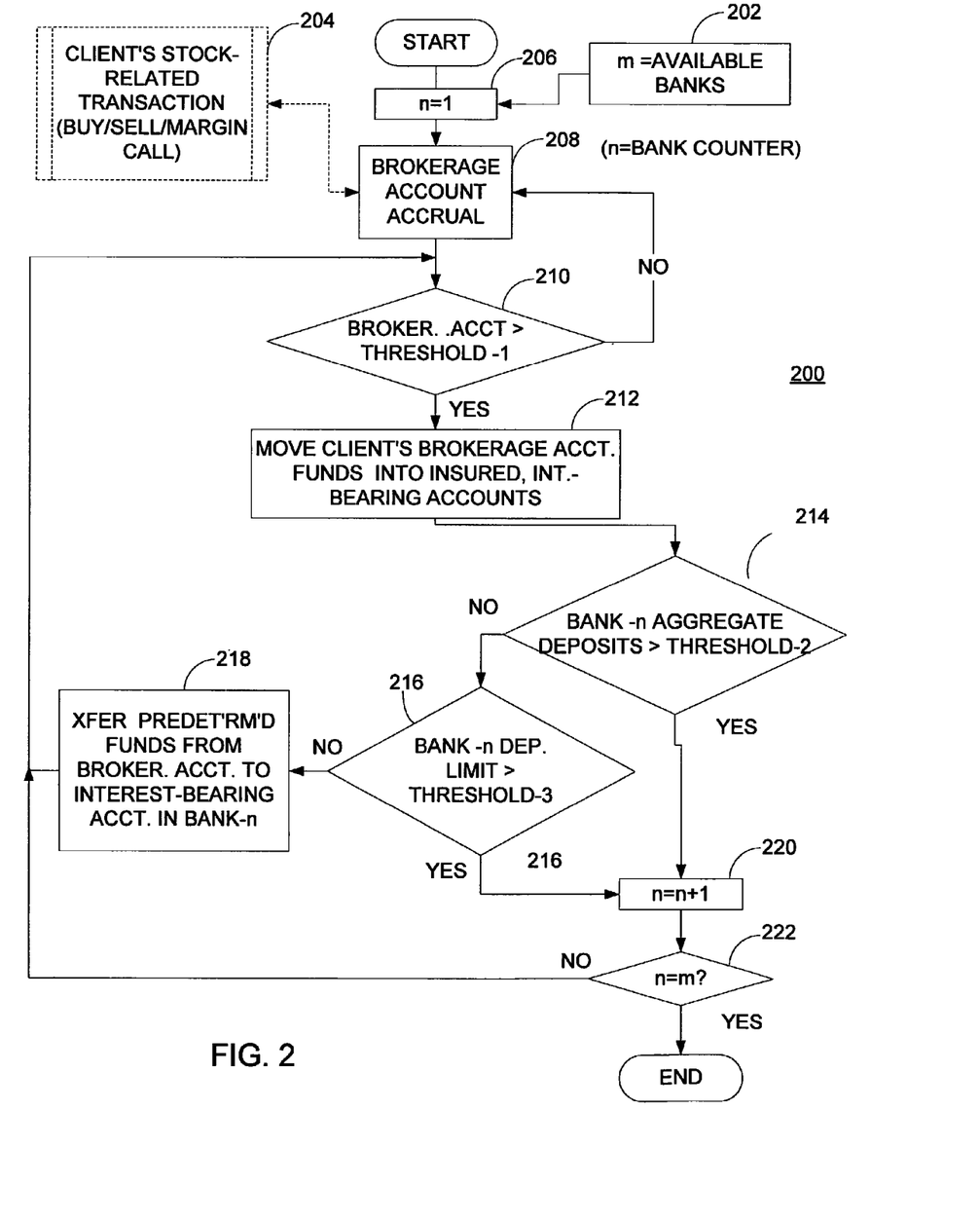
FIG. 2 is a flowchart diagram of a method of managing the funds of a client of a brokerage.

FIG. 2 shows a block diagram depiction of a method of managing funds that are held in a brokerage account of a client of a brokerage and automatically distributed to separately chartered but affiliated (e.g., commonly-owned) F.D.I.C.-insured banking entities. At step 202, a determination is made regarding the number of banks that the brokerage 12 might be able to transfer funds into. As set forth more fully below, the number of related and separately chartered banks into which funds can be transferred determines the limit to which a brokerage's client's funds can be insured. Having more banks available to accept brokerage account funds multiplies the F.D.I.C.-available limit of a client's funds that can be F.D.I.C. insured.

In one embodiment, wherein several affiliated banks 14, 16 and 18 are available to accept deposits from the brokerage 12, no one particular bank is designated as always being the first to receive client brokerage account funds. In an another embodiment, brokerage account funds are distributed to banks in a fixed sequence, which can be specified by the brokerage 12, one or more of the banks 14, 16 and 18 or the parent entity 10, which also may be changed. For purpose of illustrating the methodology, FIG. 2 depicts a method wherein the total number of affiliated banks is a variable denominated as "m." The m-number of banks, are enumerated from 1 to m, and can each receive funds from a stock-brokerage client's client-brokerage account beginning with bank no. 1. In FIG. 2, a loop counter denominated as the variable "n" is employed to track loop iterations as well as the identity of banks into which funds will be transferred. On each iteration of the loop of steps depicted in FIG. 2, loop counter n is incremented until n is equal to m whereupon a determination is made that each available bank has received funds and program execution ceases. Those of ordinary skill will recognize that the variable m does not necessarily identify a bank. On each iteration of the method, affiliated banks can be re-assigned any value between 1 and m such that funds are distributed to different banks in a different order.

In a preferred embodiment, seven banks that are commonly owned with a brokerage can accept brokerage account funds. In step 206, the loop counter, n, is initialized to "1" by which a first bank, of all available banks, is considered in the execution of the ensuing steps.

In step 204, when a client of a brokerage conducts a transaction by which transaction proceeds accrue to the client's account, i.e., funds are deposited into the client's brokerage account. Step 208 depicts accrual of proceeds of a client's transaction. Depending upon the amount of proceeds realized from a transaction (e.g., a sale or distribution) a determination is made in step 210, whether the balance of funds in the client's brokerage account exceeds a threshold denominated in step 210 as "THRESHOLD-1." THRESHOLD-1 is a brokerage account balance, above which funds will be transferred from the client's brokerage account into accounts at the banks.

In a preferred embodiment, THRESHOLD-1 is set equal to five hundred dollars ($500); when the brokerage account balance exceeds $500, the entire brokerage account balance is transferred (i.e., the brokerage account balance is zeroed) into the banks, using the methodology described hereinafter. Funds are retrieved from the banks when the brokerage account balance falls below a different threshold, shown in FIG. 3 and denominated as THRESHOLD-4. In the aforementioned preferred embodiment, THRESHOLD-4 is a debit balance of ten dollars ($10) or more. (A debit account balance is considered to be a negative account balance.) Funds are retrieved from the banks when the brokerage account debit balance is greater that $10 and retrieved in an amount sufficient to reduce the debit balance to zero, unless the bank deposit is less than the debit balance, in which case the entire bank balance is transferred back into the brokerage account. In an alternate embodiment, portions of the brokerage account balance less than 100% can be transferred into the affiliated banks when THRESHOLD-1 is exceeded; funds can be retrieved when the brokerage account balance falls below some other credit balance. As explained more fully below, funds are transferred back into a brokerage account from one or more banks, whenever a brokerage account balance drops below either a brokerage or client-specified value, which is identified in FIGS. 3 and 4 as THRESHOLD-4.

Referring to FIG. 2, in step 210, a decision is made by the brokerage as to whether the balance of the client's brokerage account exceeds THRESHOLD-1. If the brokerage determines that funds in the account exceed THRESHOLD-1, program control proceeds to step 212, which depicts that funds in the client brokerage account will be electronically transferred into one or more of the banks.

Referring to FIG. 1, several different banks 14, 16 and 18 and the brokerage 12 are affiliated by virtue of their common ownership by a parent 10. In order to better manage the flow of funds into and out of the various related banks, one or more of the brokerage 12, the banks 14, 16 and 18 and/or the parent company 10, tracks the aggregate amount of funds deposited into each of the different, banks from the brokerage 12.

Tracking the sum (or aggregate) of all deposits that flow into each bank from the brokerage has at least two advantages. First, by limiting the amount of funds that can flow into any one bank from brokerage accounts at the brokerage 12, the banks are protected from a possible run on deposits, if for example, stock market conditions arise that would encourage or require brokerage clients to withdraw cash from the banks. By limiting the total amount of client funds deposited into any one bank from brokerage accounts, the banks can be protected from exposure in the form of excessive withdrawals.

Secondly, by limiting the aggregate deposits into a bank from client brokerage accounts, the various banks that are affiliated are treated more equitably. Large sums of money that flow into an affiliated bank can be distributed in the form of loans. Idle cash reserves might create a liability for the bank if it is unable to place loans.

In step 214 of FIG. 2, a decision is made by the brokerage to determine whether the aggregate amount of brokerage funds previously transferred into bank n by the brokerage, (by virtue of a previous execution of step 210-218) exceed another predetermined threshold amount denominated in step 214 of FIG. 2 as THRESHOLD-2. The value of THRESHOLD-2 can be specified by either one or more of the banks, the parent entity 10, the brokerage or by agreement of any combination of them to protect each bank's viability. For many small to medium size banks, THRESHOLD-2 will be on the order of 25 million dollars or less. For larger institutions, the limit on funds deposited into a bank from brokerage accounts can be larger, for example, $50 million to $100 million based on the available deposits of the bank into which such funds will be transferred. In a preferred embodiment, THRESHOLD-2 is specified by the parent entity 10.

If, after step 214, the limit for brokerage account deposits into the particular bank n is not exceeded, a second test is performed by the brokerage in step 216 whereat the aggregate of deposits made for a particular client of a brokerage into the particular bank n is tested against a limit denominated as THRESHOLD-3. In step 216, the amount of funds deposited into any one bank on behalf of any one individual is limited by the brokerage to be less than or equal to the amount of insurance provided by F.D.I.C., or any other insurer of funds deposited into the bank by the brokerage.

In the aforementioned alternate embodiment, separate accounts are established at each bank for each client of the brokerage into which brokerage account funds are deposited for a client. In establishing separate accounts for each client at the banks and exchanging such information between the banks 14, 16 and 18 and the brokerage 12 via the data network 20, the existence of other accounts of the client at the various banks and that might affect the F.D.I.C. insurance available to the client, can be determined.

In another embodiment, the brokerage aggregates the brokerage account funds of several brokerage clients. The aggregate of the client brokerage accounts are then transferred to a single custodial account for the brokerage that is established at each of the banks. The banks can lend and earn interest on funds in the custodial accounts, and provide clients of the brokerage, F.D.I.C. insurance on funds in the custodial account through the use of subsidiary and other records of the brokerage and bank, which the brokerage and bank can use to establish and record ownership of funds deposited into the custodial accounts. In such an embodiment, the identity of the particular clients of the brokerage that "own" funds in a custodial account at a bank and the amount of the client's funds on deposit at the bank, need to be known to at least the brokerage. In such an embodiment, the brokerage tracks funds deposited into a bank's custodial account on behalf of each client as well as the interest earned by each client's funds. Whether a client's brokerage account funds are transferred into a separate account for the client at each bank, or instead transferred into a custodial account, along with other brokerage account funds of other brokerage clients, the funds of a client of a brokerage are transferred into an account, at a bank such that the client's funds can be F.D.I.C. insured.

If a client has funds on deposit at a particular bank which will affect the F.D.I.C. insurance provided to the client's brokerage account funds that might be deposited by the brokerage, the limit of THRESHOLD-3 can be adjusted downward as appropriate. In another embodiment, the bank can be excluded from receiving any brokerage account funds of the client. Excluding a bank from receiving a client's brokerage account funds can be accomplished by adjusting THRESHOLD-3 to zero for the client, for all clients, or by deleting the bank from the list of banks.

If at step 216 the aggregate of deposits for a particular client on deposit at a particular bank through the brokerage (or on behalf of a client by virtue of a deposit into a custodial account at the bank) do not exceed THRESHOLD-3, program control proceeds to step 218 whereat funds are automatically and electronically transferred from a client's brokerage account in the brokerage 12, into an account at the particular bank. In step 218, in order to protect a brokerage client's funds, the amount deposited into a custodial account or into an individual account for the client at affiliated bank n should be less than the F.D.I.C. insurance limits provided to the client at that bank. As is well known, the amount to which a depositor will be insured might be determined by other funds that a person has at a particular bank. Such other funds might be unknown to the brokerage therefore the amount to which a client is insured might also be unknown to the brokerage. Accordingly, in one embodiment, the amount of money transferred into a bank in step 218 should be determined by whether the client already has funds held by the bank through the brokerage. In another embodiment wherein other funds of a client that are on deposit at the bank and which are known to the brokerage (through data sharing between the brokerage and banks) the amount deposited in step 218 will be affected by the amount of such other funds. In any case, the amount deposited at each bank at step 218 by the brokerage on behalf of a client is less than or equal to the F.D.I.C. maximum that is provided to insured accounts. In the preferred embodiment described above, funds are transferred at the close of each business day. In alternate embodiments, funds can be transferred at different points of time, e.g., in real time, hourly, monthly, weekly, etc.

Electronic funds transfers are well known in the art. In FIG. 1 and in the method steps depicted in FIG. 2, electronic funds transfers are readily accomplished by appropriate file transfers between the brokerage 12 and one or more of the affiliated banks 14, 16 and/or 18. Well-known data links such as Ethernet 20 or the Internet 23 and suitable data links 24 and 26 provide mechanisms by which electronic funds transfers can be realize between the brokerage 12 and a bank 14, 16, and 18. Inasmuch as the banks and brokerage are affiliated, client information can be provided to the banks from the brokerage. Information such as the client's name, address, social security number, marital status, and account ownership etc., are readily available from the brokerage and can be provided to the banks via electronic data transfers. Exchanging information on clients and accounts between the banks and brokerage enables the brokerage and the banks to establish accounts for brokerage clients and to identify whether a brokerage account might have funds on deposit at one or more banks.

From step 218, program control returns to step 210 where the brokerage account balance is re-checked by the brokerage. In the embodiment described in paragraph 21, in which an entire account balance when THRESHOLD-1 is exceeded, step 210 will be "true" and steps 210-218 re-executed as long as the brokerage account balance is greater than zero. In alternate embodiments, steps 210-218 will be repeated until the brokerage account balance is sufficiently reduced to be below a brokerage-specified or client-specified balance. When program control returns to step 210 from step 218, if the balance in the brokerage account is either zero or some other brokerage-specified or client-specified balance, program control will thereafter flow to step 208 to wait for another transaction that will affect the brokerage account balance. So long as the brokerage account balance remains above THRESHOLD-1, program control will continually loop through steps 208 and 210, placing a client's brokerage account funds into different banks until the brokerage account balance is brought to zero or below some other brokerage or client-specified balance.

As can be seen in FIG. 2, if the brokerage, the parent entity 10 or one or more of the banks 14, 16 and 18 determine that aggregate deposits into a bank exceed THRESHOLD-2 or if the aggregate deposit for a client exceeds THRESHOLD-3, program control will proceed to step 220, where the loop counter n is incremented, which causes another bank to be selected to receive client brokerage account funds. From step 220, program control returns to step 210 albeit with another bank selected. As the program repeats steps 210, 214 and 216, the loop counter n is incremented in each iteration whereby each affiliated bank is selected to receive brokerage account funds from the brokerage. Inasmuch as the loop counter n is initially set to 1 at step 206, when steps 214 and 216 are first executed, they will consider one particular bank denominated as "bank 1" the actual identity of which can be determined arbitrarily. As steps 210, 214, 216 and 220 are executed, successive banks (numbered/identified from "1" up to n, until n=m) are considered to receive client brokerage account funds. As set forth above, the method depicted in FIG. 2 is for illustration. In one embodiment, no one particular bank is identified as the first bank (ostensibly corresponding to the loop counter n value="1") designated to always be the first to receive brokerage account funds. Other embodiments include ordering or specifying the banks into which funds are to be deposited, which order or specification can also be changed. Indeed, the first bank into which a client's funds are deposited can be determined randomly or by other factors. One embodiment enables clients of a brokerage to direct the brokerage to exclude one or more of the banks 14, 16 or 18 from receiving the client's funds.

As the loop counter n is incremented in step 220, program control proceeds to step 222 where a test is performed to determine if n is equal to m, where m is the total number of the affiliated banks have been considered to receive brokerage account funds. At step 222, program execution ceases when n equals m, (which means that all m banks have received each bank's limit of client funds).

By repeatedly executing the loop of 210, 212, 214, 216 and 220, a client of a brokerage can have funds transferred by the brokerage into one or more banks, in amounts that can be adjusted by the client, the banks or the brokerage. By depositing funds into banks that are commonly owned, albeit separately chartered (so as to multiply F.D.I.C.-provided deposit insurance), information about client/depositor identities can be shared and used among the affiliated banks. Interest earned by a brokerage client on transferred funds is readily reported back to the brokerage for inclusion in the brokerage's reports and statements to clients.

While FIG. 2 provides for automatic investment of brokerage account funds, as is well-known, client brokerage account funds often need to be replenished from time to time. By way of example, an investor's purchase of additional securities might necessitate an infusion of cash into the brokerage account to cover the purchase price, of, the balance of a margin account might need to be supplemented due to fluctuating market conditions. Accordingly, a complementary method for recovering funds back from the affiliated and separately chartered banks, renders the method of FIG. 2 more useful.

Figure 3:
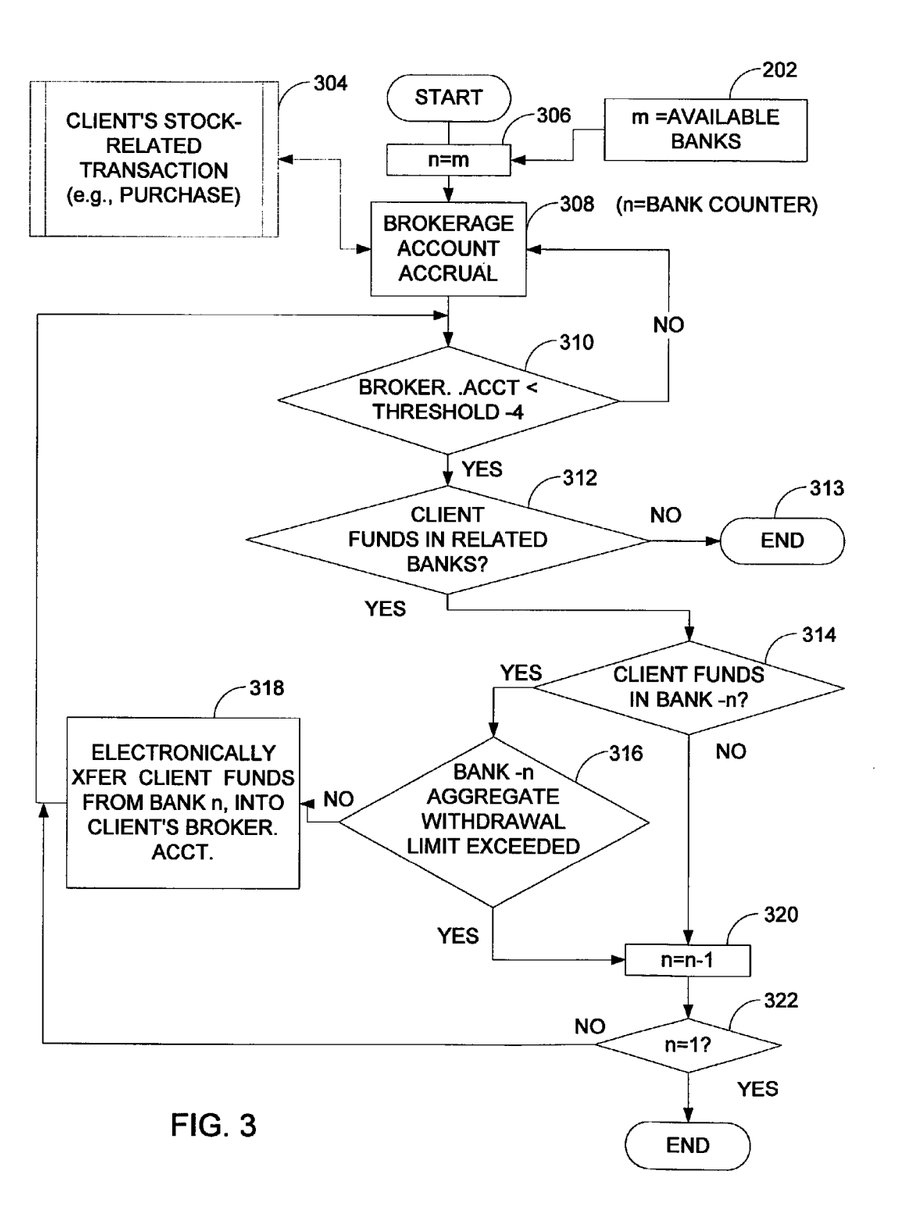
FIG. 3 is a flowchart diagram of a method of recovering funds of a client from affiliated banks in which funds of a client of a brokerage were deposited.

FIG. 3 depicts steps of a method for determining when client brokerage account funds are below a predetermined amount and in such a case, automatically electronically transferring funds back from interest bearing accounts at various banks so as to maintain a brokerage or client-required balance in the client's brokerage account. Such a method is useful if funds of a client of a brokerage fall below some client-specified threshold amount or fall below a brokerage-specified amount. By automatically and electronically transferring funds back into the brokerage account, the client's brokerage account minimum balance can be maintained.

It step 304, a transaction or other event or condition, such as a purchase or margin call, affects the brokerage account balance, such that a new balance is accrued in step 308. At step 310, a decision/determination is made whether the balance in the brokerage account has fallen below THRESHOLD-4. THRESHOLD-4 can be either client-specified or brokerage specified but is the balance of the brokerage account below which, additional funds are required.

As set forth above, THRESHOLD-1 is the threshold above which funds are transferred out of the client brokerage account and into banks. Because THRESHOLD-4 triggers funds retrieval from the banks, THRESHOLD-1 and THRESHOLD-4 should be sufficiently different amounts in order to prevent an automatic deposit using the method of FIG. 2 from triggering an automatic electronic retrieval using the method of FIG. 3 (or FIG. 4). In the embodiment described in paragraph 21, THRESHOLD-4 is set to be ten dollars ($10) below zero. In alternate embodiments, THRESHOLD-4 can be other negative values, zero or values above zero.

If at step 310 a determination is made that the balance in the brokerage account is not below THRESHOLD-4, program control returns to step 308 where the balance in the brokerage account is monitored. If at step 310 the balance in the brokerage account is below THRESHOLD-4, a test is made in step 312 to determine whether client funds are on deposit in any of the affiliated banks shown at FIG. 1. If no client funds are in the affiliated banks, program control ends at step 313 and the brokerage account balance must be covered by some other mechanism.

If client funds were previously deposited into one or more of the affiliated banks, program control proceeds through step 312 to step 314 whereat the n'th of m affiliated banks is tested to determine whether or not a particular client's funds are on deposit therein. If so, at step 316 a test is made whether an aggregate withdrawal limit for that bank has been exceeded during that day, week, month or other period of time over which withdrawals may be made from the bank. Like THRESHOLD-2 described above, a withdrawal limit in step 314 protects a bank from excessive withdrawals. The withdrawal limit of step 314 can be specified by a particular bank n, the brokerage 12 or the parent entity 10.

If a client's funds are being held by the bank and if the aggregate withdrawal limit for that bank has not been exceeded, at step 318 funds are electronically transferred from the particular bank, back into the client's brokerage account. Program control returns to step 310 whereat the test of the brokerage account balance is made again.

If at step 314, it is determined that the client has no funds on deposit at a particular bank, the loop counter n is decremented in step 320 whereby the next-to-last bank will be checked for client funds on deposit. A loop count limit is tested in step 322 to see if the last bank has not been checked for client funds. If not all banks have been emptied of client funds, from step 322 program control returns to 310 where the brokerage account balance is tested again. If the account balance is below THRESHOLD-4, program control proceeds through step 312 to step 314 where a test is made for the existence of client's funds in the next bank to be checked in sequence.

It should be apparent to those of skill in the art that the method of FIG. 3 withdraws funds from banks in a reverse order as that used to deposit funds that is depicted in FIG. 2. In other words, in FIG. 3, the number of affiliated banks is set to m and, beginning with the m'th bank, each of the m banks is sequentially queried about a client's funds until the 1st bank is tested. Amounts are withdrawn from each bank in sequence and transferred into the brokerage account at least until the amount of THRESHOLD-4 is met or exceeded. In so doing, the balance accrued in the account can be maintained either above a client-specified minimum or a brokerage-specified minimum.

Figure 4:
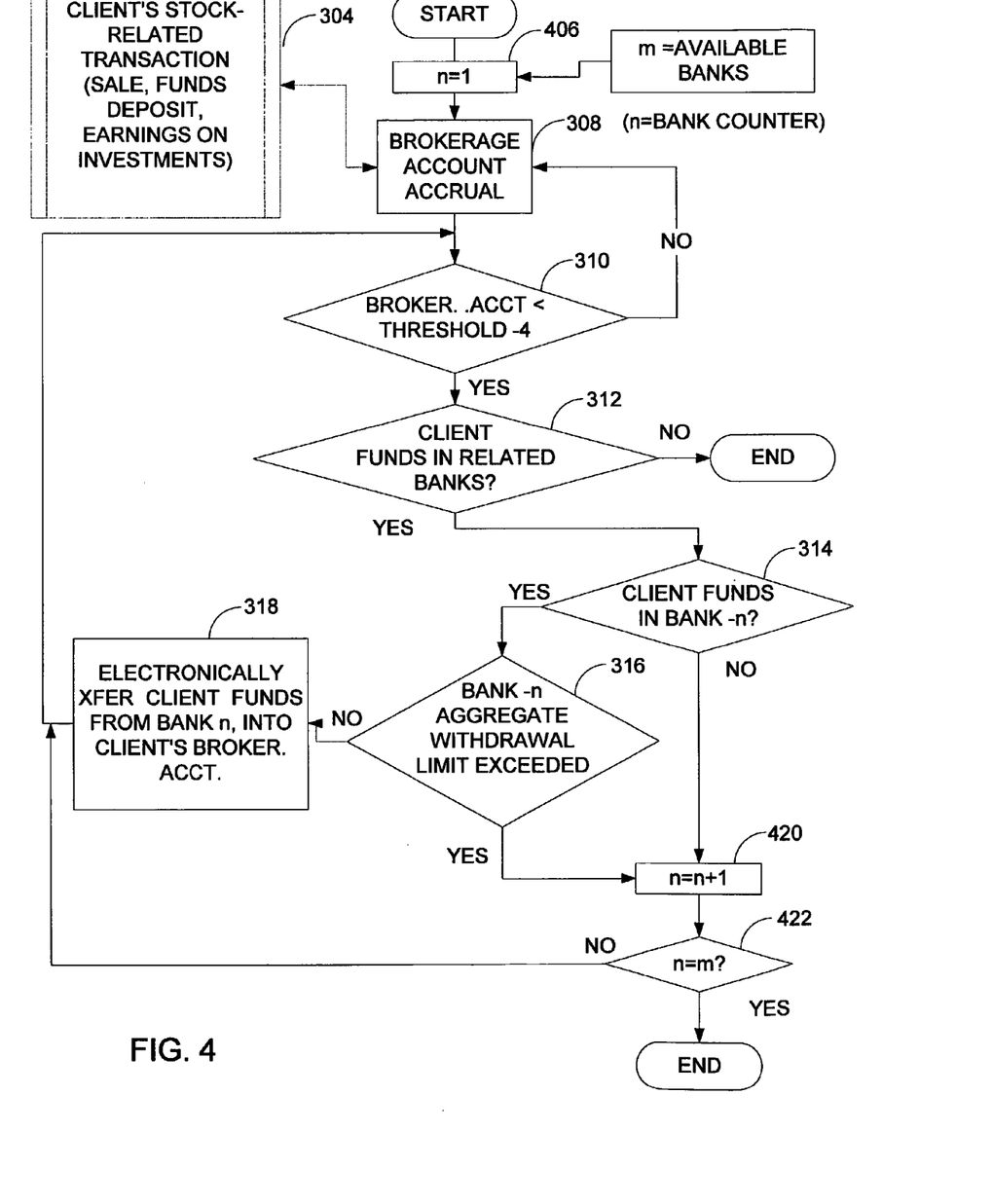
FIG. 4 is an alternate embodiment of a method of managing funds of a client and depicts an alternate method of retrieving funds of a client from deposits in related banks.

While the method depicted in FIG. 3 starts at the last bank into which funds were deposited and then ostensibly counts down banks until the first bank is depleted of client funds, another, and equivalent withdrawal method is shown in FIG.

4. In the method of FIG. 4, a "first" bank into which funds were deposited is queried until the last bank is emptied of client funds. FIG. 4 differs from FIG. 3 only at steps 406, 420 and 422.

At step 406, the loop counter n is initialized to "1" corresponding to the first bank into which funds were deposited using the methodology of FIG. 2. Program control in FIG. 4 proceeds through steps 308, 310, 312, 314, 316 and 318 in order to replenish funds in the brokerage account of the client, however at step 420, the loop counter n is incremented whereby the second bank into which funds were deposited, is checked by successive execution of steps 310, 312, 314, 316 and 318. Program control proceeds through the aforementioned steps until, at step 422, the last of all m-available banks are checked for client funds on deposit.

It should be apparent from the foregoing that a method of managing funds of a client of a brokerage is provided by electronically transferring funds out of the brokerage account into accounts for the client at affiliated banks. In a preferred embodiment, affiliated banks are those that are commonly owned, albeit separately chartered banks so as to multiply F.D.I.C.-provided insurance to depositors.

As shown in FIGS. 3 and 4, funds can be automatically and electronically transferred back from the interest bearing accounts into the client brokerage account in amounts sufficient to cover an amount specified by the client or required by the brokerage. In one preferred embodiment, funds are withdrawn from the last bank into which funds were deposited until the balance thereat is zero. In an alternate embodiment, funds can be first withdrawn from the first bank into which funds were deposited. In the former embodiment, funds follow a last in-first out ordering. In the latter example, funds follow a first-in, first-out methodology. In yet another methodology, not shown in the figures, funds can be withdrawn in substantially equal amounts from all of the banks so that all account balances are drawn down substantially equally.

One embodiment of the foregoing method for depositing funds into banks is realized by a daily accounting of brokerage account balances by the brokerage accompanied by a daily re-distribution of brokerage account funds into one or more banks. At the end of each day's activity, brokerage account funds are tabulated in order to determine the amount of brokerage account funds to transfer. Individual client account balances that comprise the total amount of brokerage account funds to distributed to the banks are tracked by the brokerage. If no funds are deposited to a bank, previously-made deposits are deemed withdrawn.

After tabulating the total amount of brokerage account funds to distribute at the end of a trading day, the brokerage posts that amount to one of the co-owned/separately charted banks. That bank posts amounts to other co-owned and affiliated banks according to the methodology described above, albeit into a custodial account at each bank. At the end of each trading day, the balance in each custodial account at each bank is adjusted by the brokerage up or down, to effectively provide for a transfer of funds into and out of the brokerage. From the perspective of the brokerage account client, funds in the brokerage account are moved into and out of different banks as necessary.

Those of ordinary skill in the computer arts will recognize that the methodology depicted in FIGS. 2, 3 and 4 and described above are readily accomplished by using a programmed computer. In a preferred embodiment, the method steps set forth above are executed by one or more computers of the brokerage 12.

Figure 5:
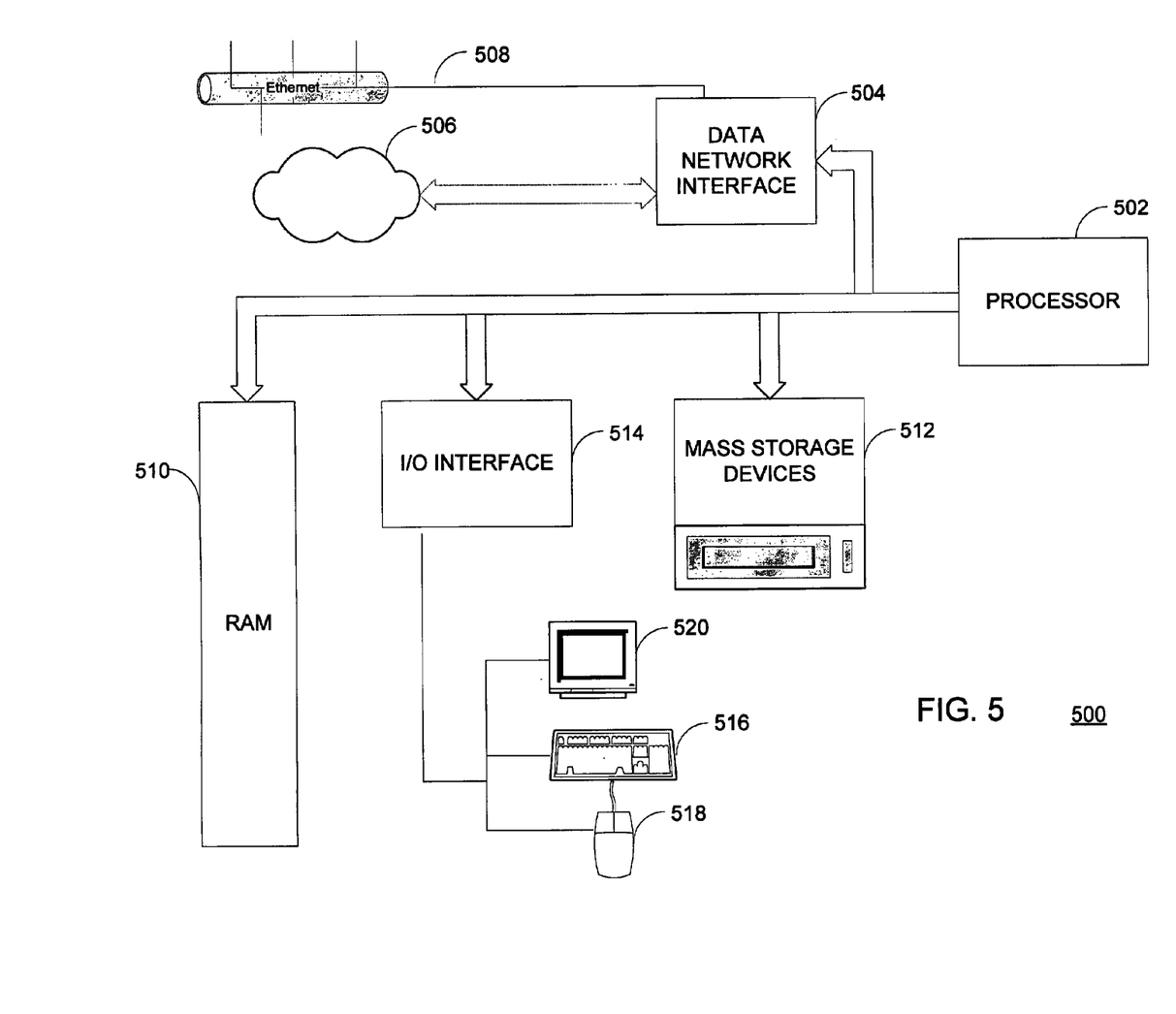
FIG. 5 depicts a computer for managing the funds of a client of a brokerage.

FIG. 5 is a depiction of a brokerage computer, programmed to manage funds according to the aforementioned methodologies. A processor 502 is operatively coupled to a data network interface 504, the function of which is to couple the computer/processor to either the Internet 506 or perhaps an Ethernet network 508 or other equivalent network by which data communications can be had with other related banks so as to provide for automatic electronic funds transfers.

The processor 502 executes stored program instructions that reside in random access memory (RAM) 510. The stored program instructions can be loaded into RAM 510 from mass storage devices 512, such as an optical disk, a magnetic disk or other bulk storage device.

An input-output (I/O) interface, 514 enables instructions or data to be input to the computer 500 via a keyboard 516, mouse 518, and results to be displayed on a monitor 520.

RAM 510 or other mass storage memory 512 will also store records of clients and client funds held in a client's brokerage account (not shown in the figures but well-known in the art). The RAM 510 and other mass storage 512 will also store program instructions which, when they are executed will cause the processor 502 to perform various functions, including the ability to perform the methods depicted in FIGS. 2, 3 and 4 and as described above.

Amongst the functions performed by the processor 502 in response to those stored program instructions are the accrual of funds into a client account, as a result of trades and other transactions made on behalf of a client by the brokerage. As funds accrue in the client's account, program instructions will cause the processor 502 to determine when the brokerage account funds exceed an amount above which funds should be transferred into a interest bearing and insured account at an affiliated bank.

As funds are transferred from the brokerage account of a client into an affiliated bank, program instructions will also monitor the amount of a client's funds transferred into a particular bank. Funds can be transferred into an individual account for the client at the bank, or into a custodial account into which funds of other brokerage account clients are deposited. When the balance in the client's brokerage account falls below either a client-specified amount or a brokerage specified amount, program instructions cause funds to be retrieved from the client's account at one or more of the banks or from the client's portion of funds in a custodial account.

In a preferred embodiment, as funds are transferred from the client brokerage account into a first bank, program instructions will cause the processor 502 to monitor the amount of money sent into an account of a client at each bank so as to keep the amount of money deposited into each bank for each client below the F.D.I.C. insurance limit. As a client's funds on deposit in a particular bank approach the F.D.I.C. limit, program instructions send funds into other banks whereat separate accounts can be established for the client (or whereat a separate custodial account exists) thereby protecting the client from having funds on deposit at a bank for which the F.D.I.C. limit was exceeded.

It should be apparent from the foregoing that funds on deposit in a client's brokerage account can be safely and securely transferred into funds for the client at separately chartered, but affiliated, banks whereby client data can be readily passed between affiliated institutions, expediting the establishment of client accounts and preserving the confidentiality. Moreover, by transferring client account funds into affiliated banking institutions, the amount of funds deposited into any one bank or withdrawn from any one bank can be more closely controlled preserving the viability of all such banks if such control were not present. By maintaining control of potentially large sums of money from client brokerage accounts, the earnings realized by each of the banks that receive client brokerage account funds from appropriate loans of such funds, ultimately passes up from each bank to the single parent company.

What is claimed is:

1. A method of managing funds held in a brokerage account of a client of a brokerage within a computer with a processor, a data network interface coupling the processor to computers of a plurality of separate banking entities that are separately chartered and affiliated and each hold at least one interest bearing account, and a memory for storing program instructions which when executed cause the processor to perform said method comprised of executing in the memory program instruction that perform the steps of:

on a daily basis accruing funds into a brokerage account of a client at said brokerage;

determining using a program in memory if the daily accrued funds into the brokerage account of the client is above a first threshold value;

moving at least a portion of the daily accrued funds of the client to at least one of an interest bearing accounts in a first of a plurality of commonly owned separate banking entities after validation that a sum of all deposit amounts from the brokerage account does not exceed a permissible amount of a second threshold value at the first of the plurality of commonly owned banks, and a deposit limit for the client at the first of the plurality of commonly owned banks does not exceed a third threshold value;

in an iterative fashion, for at least a second of the plurality of commonly owned separate banking entities, determining using the program in memory if the client brokerage account available funds for transfer exceeds the first threshold, and move at least a portion of the daily accrued funds of the client to at least one of an interest bearing accounts in the second of a plurality of commonly owned separate banking entities after validation that the sum deposit amount from the brokerage account into the second of a plurality of commonly owned separate banking entities does not exceed a permissible amount of a second threshold value at the second of the plurality of commonly owned banks, and a deposit limit for the client at the second of the plurality of commonly owned banks does not exceed a third threshold value.

2. The method of 1, wherein said third threshold is less than or equal to the insurance amount provided for account balances by the F.D.I.C.

3. The method of claim 1, further including the step of:

determining using the program in memory when the client brokerage account funds are a debit balance of at least ten dollars; and automatically electronically transferring funds from at least one of said plurality of separately chartered banks, back into said brokerage account, in an amount sufficient to bring the brokerage account balance to zero.

4. The method of claim 1, wherein at least one of said plurality of commonly owned separately chartered banks banking entities is excluded by said client.

5. The method of claim 1, wherein said third threshold is less than or equal to the insurance amount provided for account balances by the F.D.I.C.

6. The method of claim 1, wherein the first threshold is equal to five hundred dollars.

* * * * *